(12) United States Patent
Conrad

(10) Patent No.: US 12,325,321 B2
(45) Date of Patent: Jun. 10, 2025

(54) BATTERY AND LIFT

(71) Applicant: William P. Conrad, Memphis, TN (US)

(72) Inventor: William P. Conrad, Memphis, TN (US)

( * ) Notice: Subject to any disclaimer, the term of this patent is extended or adjusted under 35 U.S.C. 154(b) by 0 days.

(21) Appl. No.: 18/126,955

(22) Filed: Mar. 27, 2023

(65) Prior Publication Data

US 2024/0375540 A1 Nov. 14, 2024

(51) Int. Cl.
*B60L 53/80* (2019.01)
*B60K 1/04* (2019.01)

(52) U.S. Cl.
CPC ............... *B60L 53/80* (2019.02); *B60K 1/04* (2013.01); *B60K 2001/0455* (2013.01)

(58) Field of Classification Search
CPC .... B60L 53/80; B60K 1/04; B60K 2001/0455
See application file for complete search history.

(56) References Cited

U.S. PATENT DOCUMENTS

| | | | |
|---|---|---|---|
| 2022/0234434 A1* | 7/2022 | Tottori | B60L 58/26 |
| 2023/0211705 A1* | 7/2023 | Zeamer | B60K 11/04 |
| | | | 180/68.1 |
| 2024/0375540 A1* | 11/2024 | Conrad | B60L 58/26 |
| 2024/0408978 A1* | 12/2024 | Schweitzer | B66F 9/07531 |
| 2025/0108682 A1* | 4/2025 | Kinugawa | B60K 1/04 |

\* cited by examiner

*Primary Examiner* — Erez Gurari
(74) *Attorney, Agent, or Firm* — David J Kreher

(57) ABSTRACT

A lift and battery system to be used with an electric vehicle, for example, farm equipment, wherein the lift is attached to the electric vehicle the battery operates so that batteries can be removed and installed without returning to a central battery installation location. An auxiliary battery is also on the electric vehicle to allow the vehicle to be operated with the battery is depleted or being installed.

6 Claims, 15 Drawing Sheets

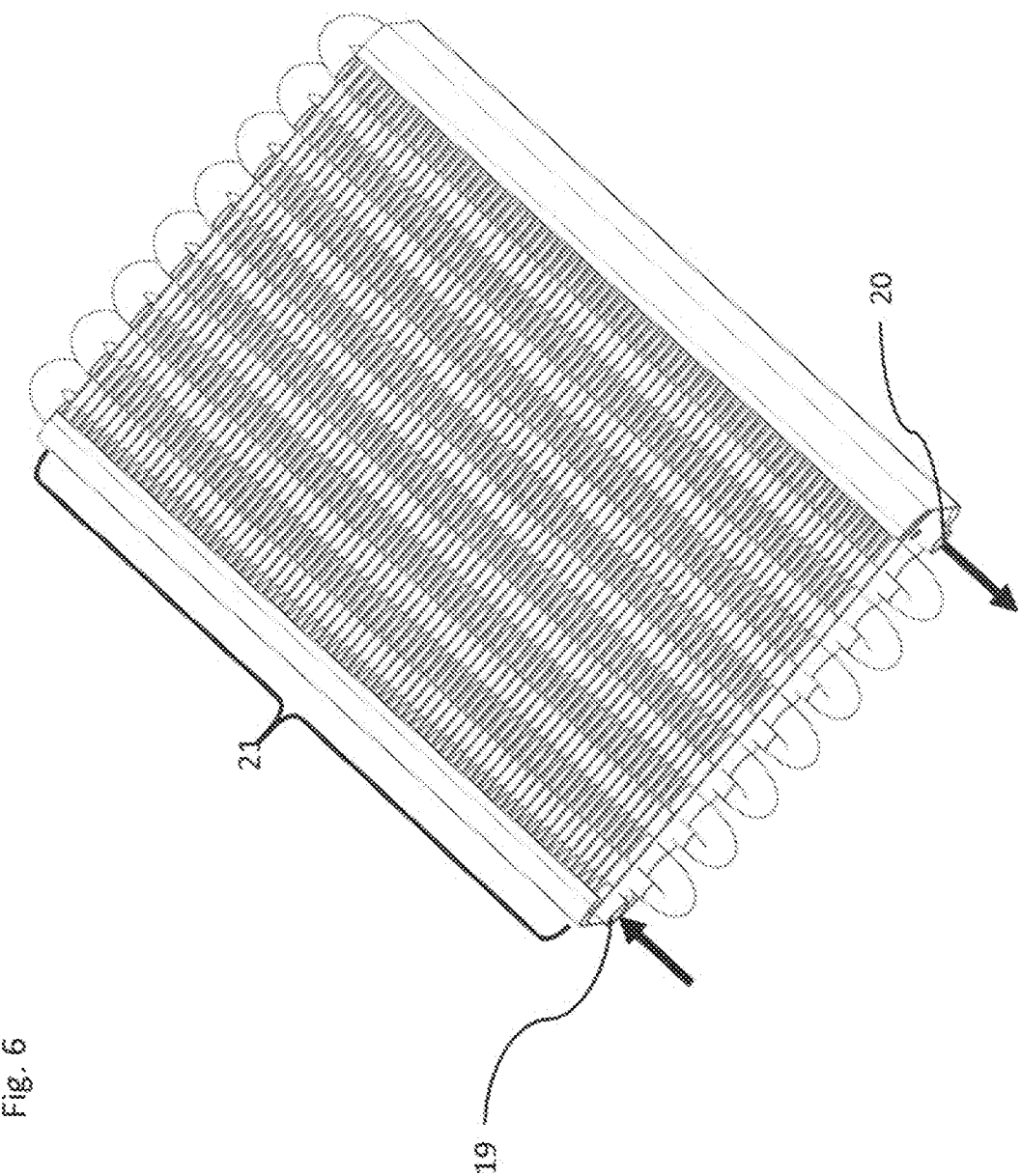

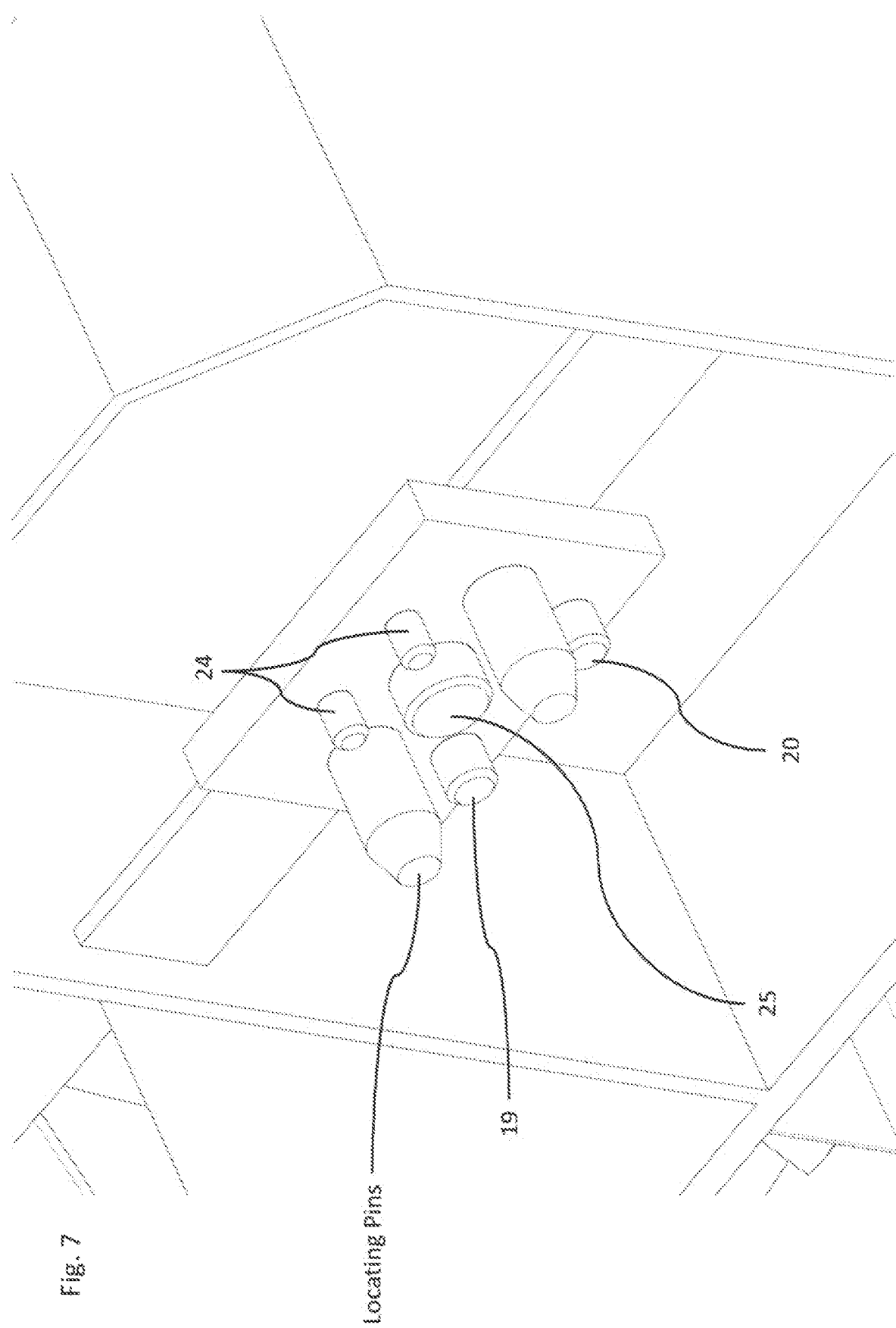

BATTERY AND LIFT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

1. Field of the Invention

The disclosed battery and lift are used with electric vehicles to facilitate the exchange of the battery in the vehicle without having to return to a central location to make the exchange. For example, fully charged batteries can be placed around a field that is being tilled or planted, and when the equipment tilling the field needs to replace a depleted battery it can pull over to a placed battery, drop off the depleted battery, install the replacement battery, and continue tilling without going back to a charging location.

BACKGROUND OF THE INVENTION

An issue with battery powered farm equipment or long-distance hauling is that when the battery powering the equipment is depleted, the equipment must either be charged overnight or go to a central swapping station to have the battery replaced. The present invention discloses a vehicle with a built-in lift system so that when a battery needs to be replaced, the vehicle can go to a nearby fully charged battery and quickly replace the depleted one, eliminating the travel time and battery power consumption to and from the battery swapping station, or the long wait to recharge.

SUMMARY OF THE INVENTION

The present disclosure reveals a battery-operated vehicle with a built-in lift to facilitate the installation and removal of the vehicle's battery. The lift is operated by an auxiliary battery that operates the vehicle only when the battery is depleted or removed. The battery connects to the vehicle through a port coupler that also facilitates the transfer of coolant to and from the battery, as well as system monitoring signals such as operating temperature and cell voltages. The port coupler can be either manually or automatically/autonomously connected during installation of the battery.

BRIEF DESCRIPTION OF THE SEVERAL VIEWS OF THE DRAWING

FIG. 6 is a view of the heat exchanger;

FIG. 7 is a view of the port coupler;

DETAILED DESCRIPTION OF THE INVENTION

Figure 1:
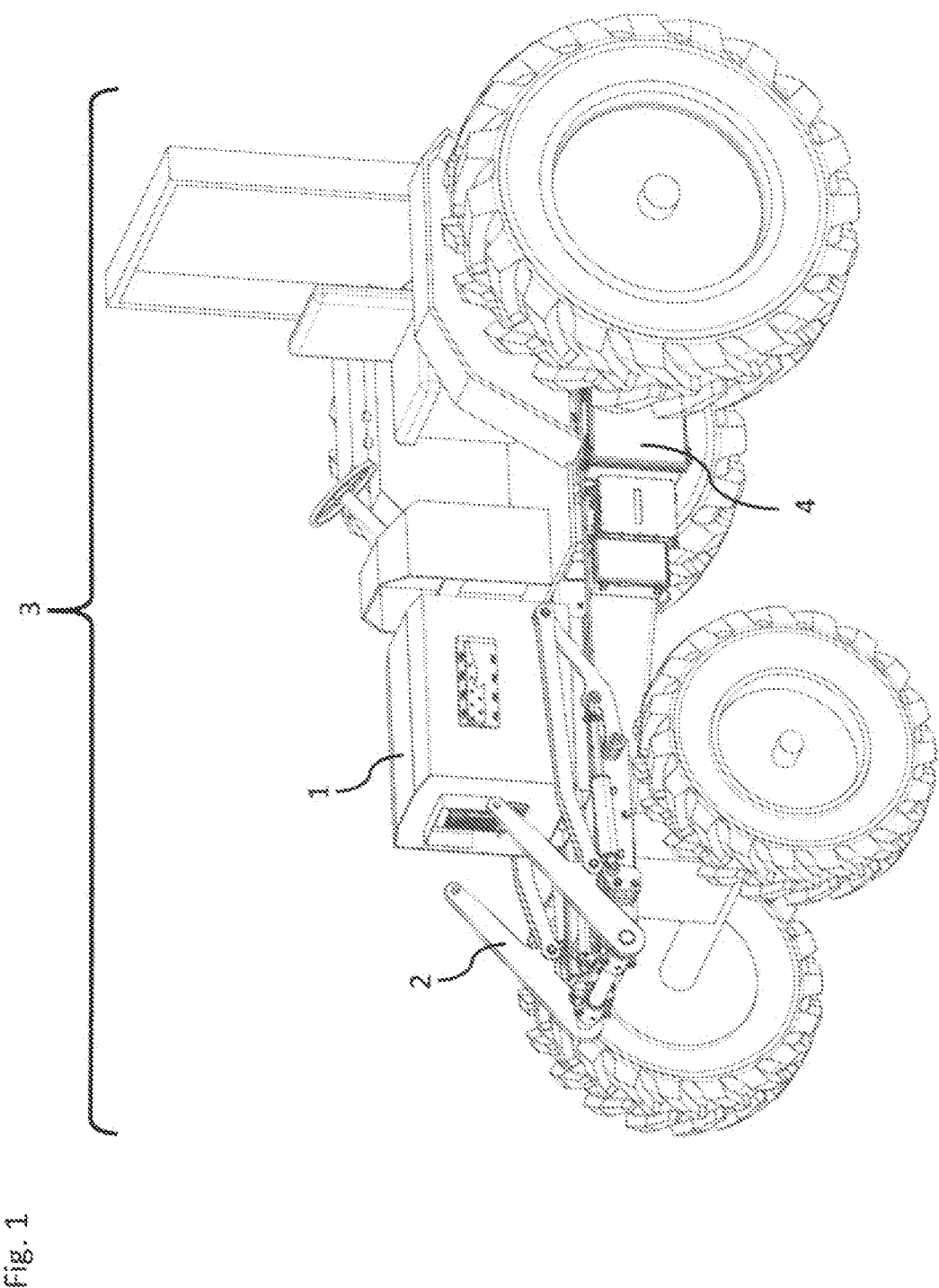
FIG. 1 is a view of the vehicle with the lift and battery in place and shows the location of the operator station, battery, lift system, coolant system, and auxiliary battery.
Figure 2:
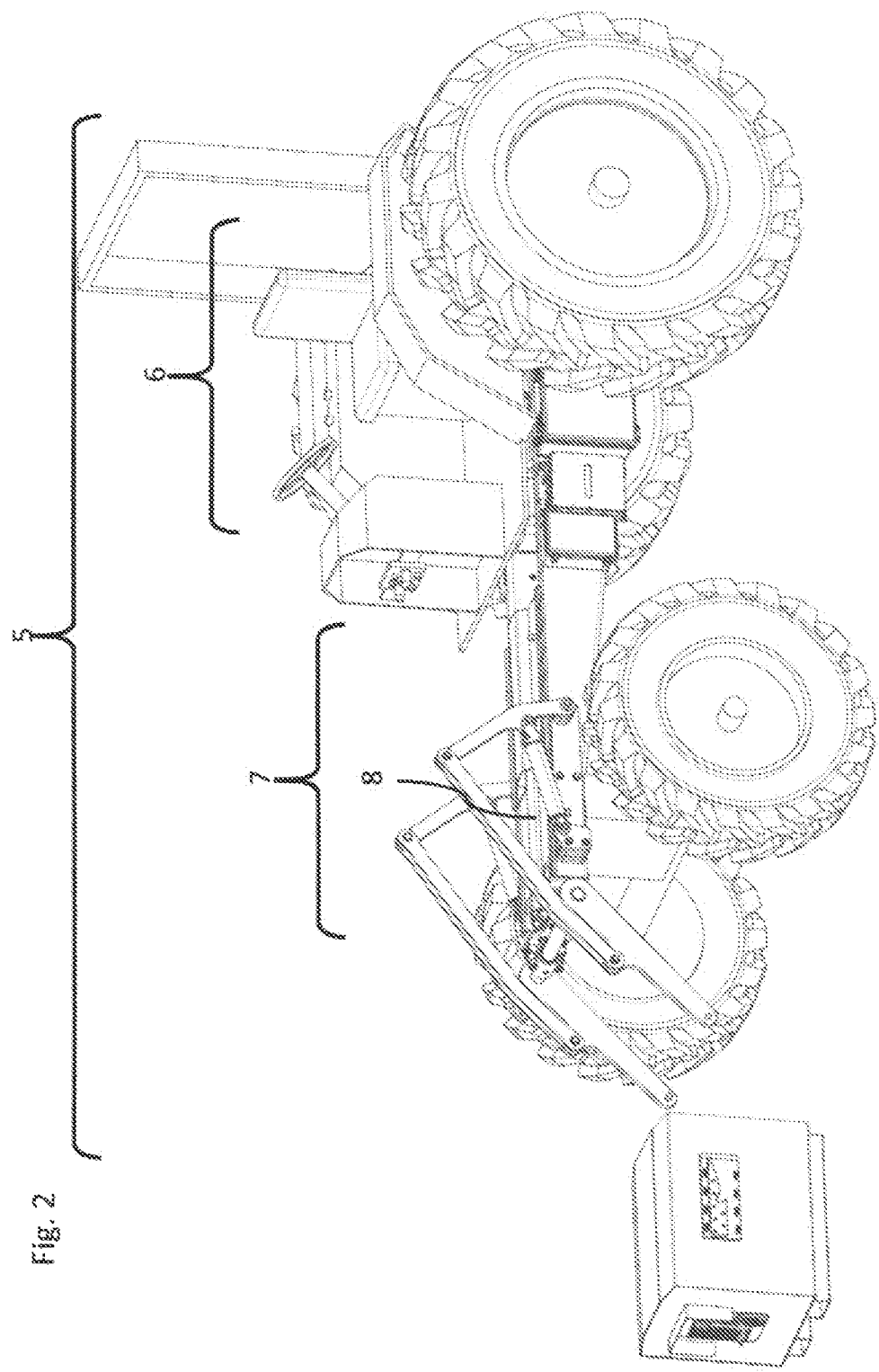
FIG. 2 is a view of the vehicle without the battery including the space, operator station, lift system, coolant system, and auxiliary battery.
Figure 3:
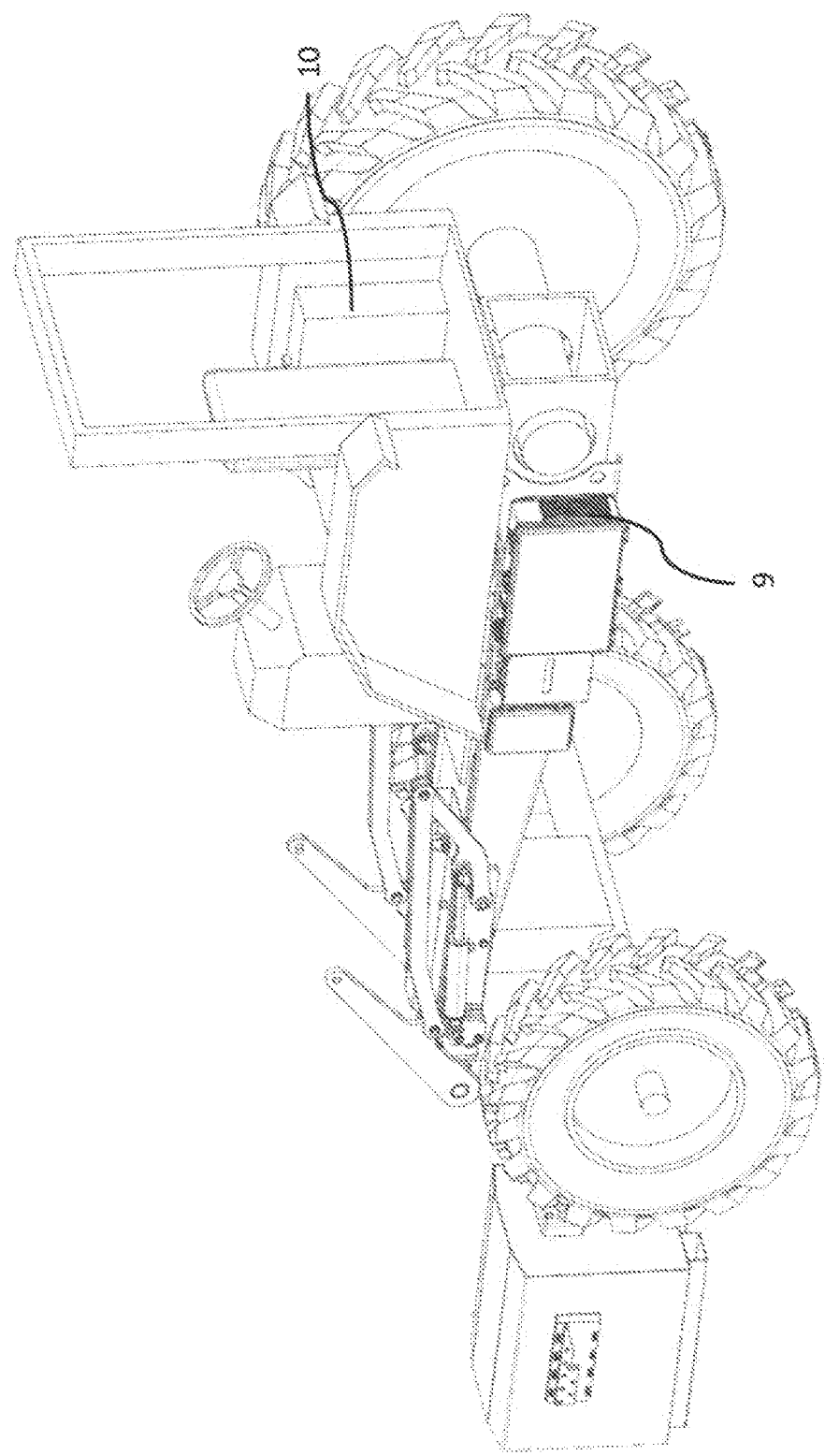
FIG. 3 is a view of the auxiliary battery system.
Figure 4:
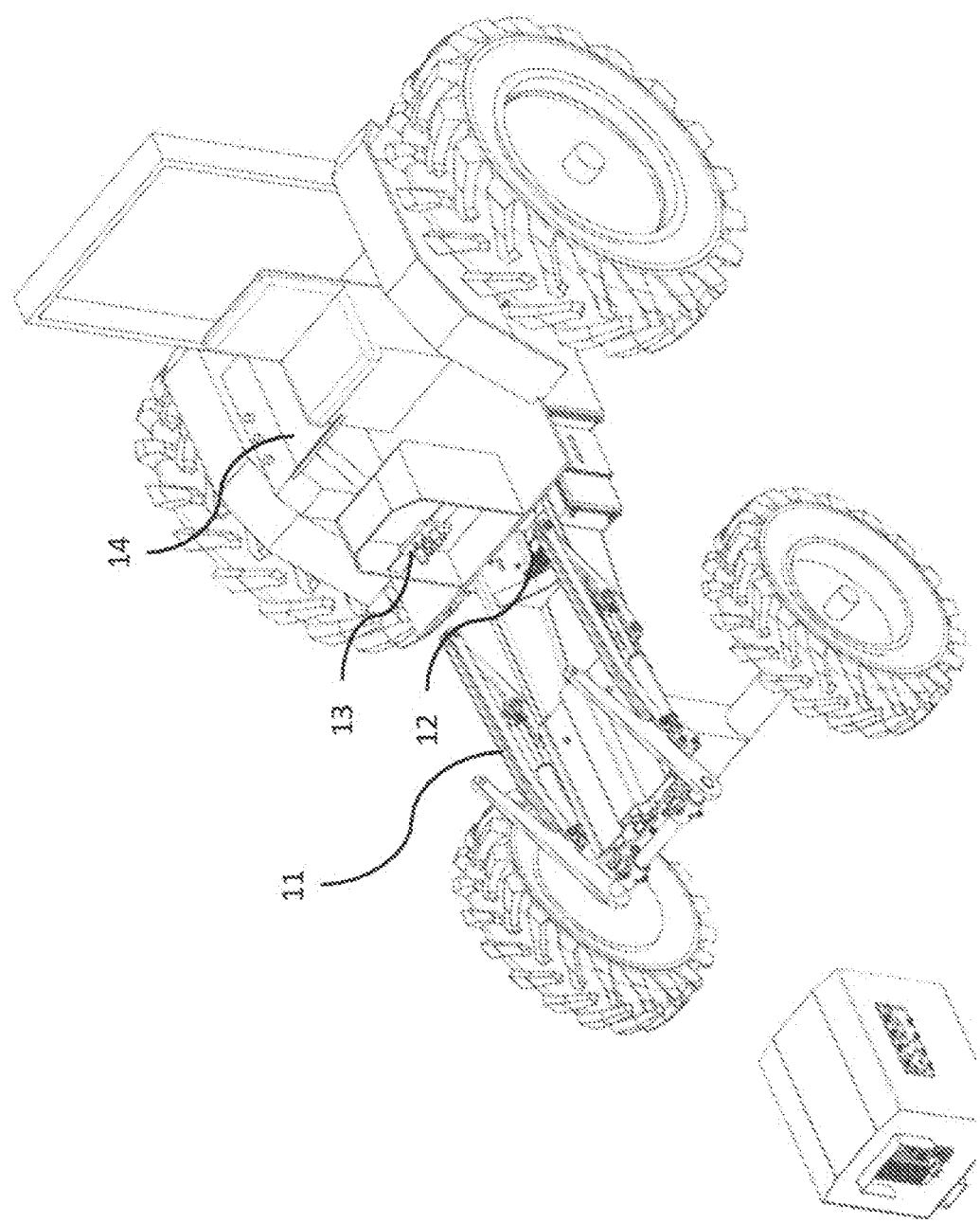
FIG. 4 is a top view of the electric vehicle with the battery unloaded.
Figure 5:
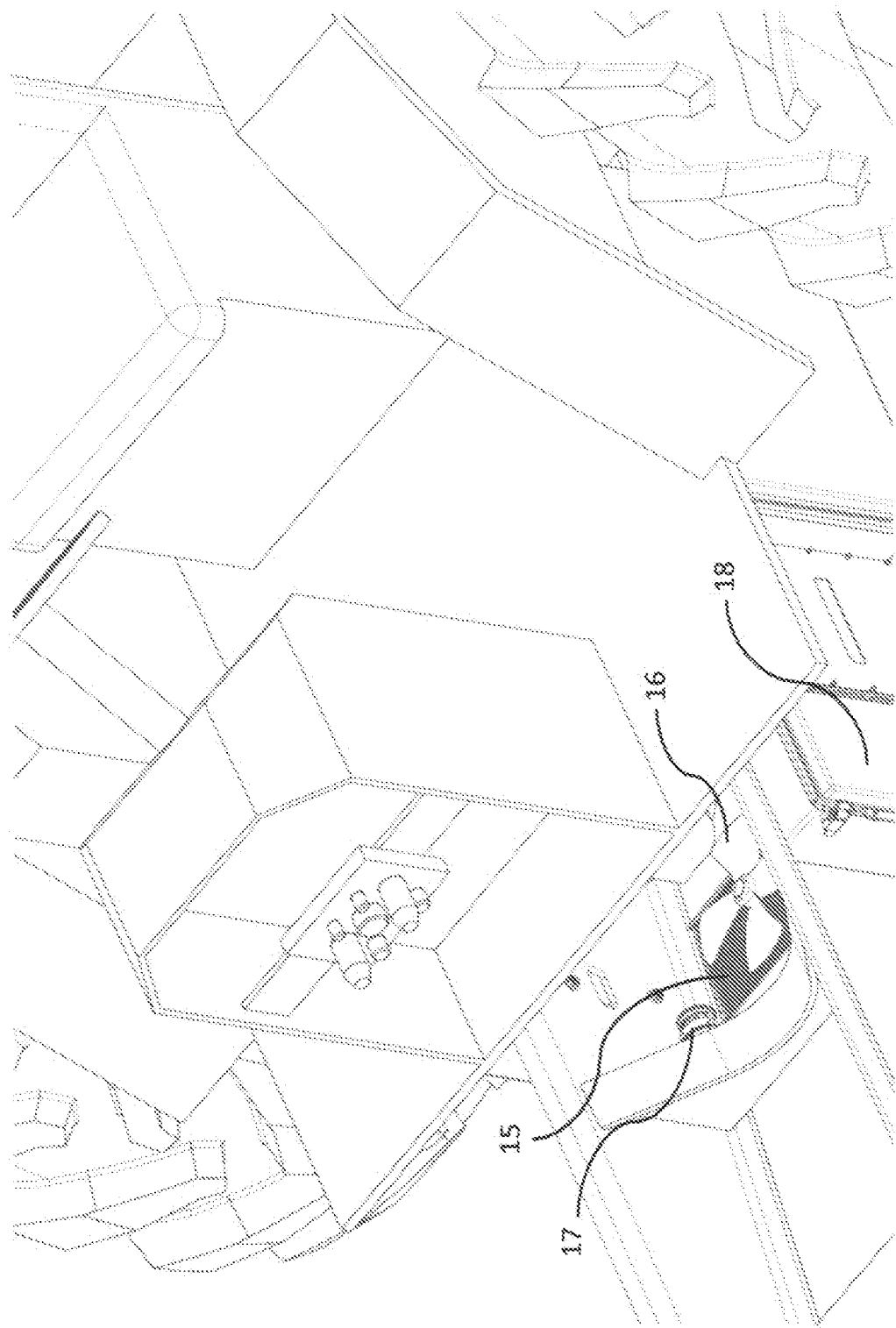
FIG. 5 is a view of the coolant system.
Figure 8A:
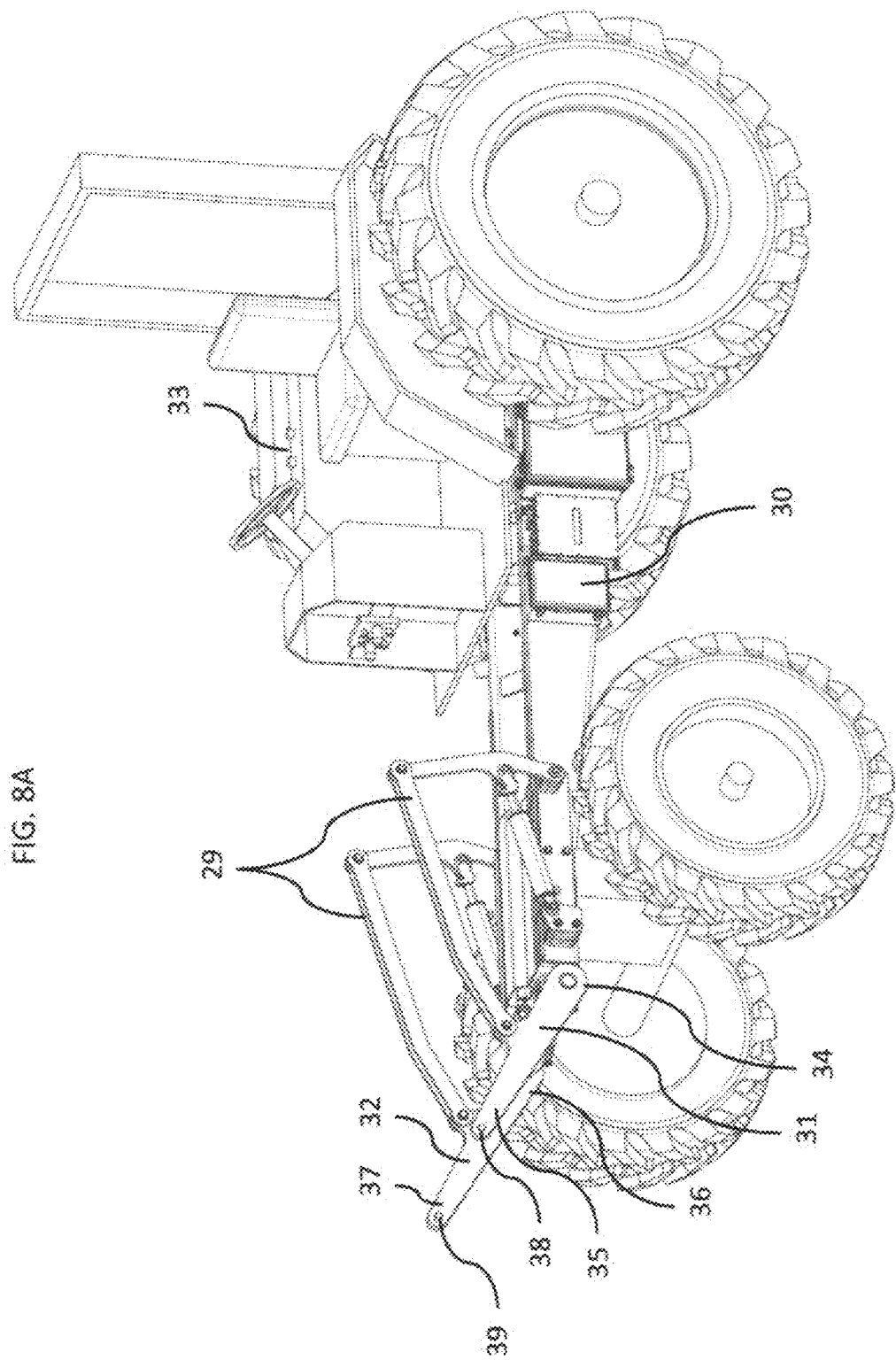
FIG. 8A is a view of the lift including the left arm and the right arm.
Figure 8B:
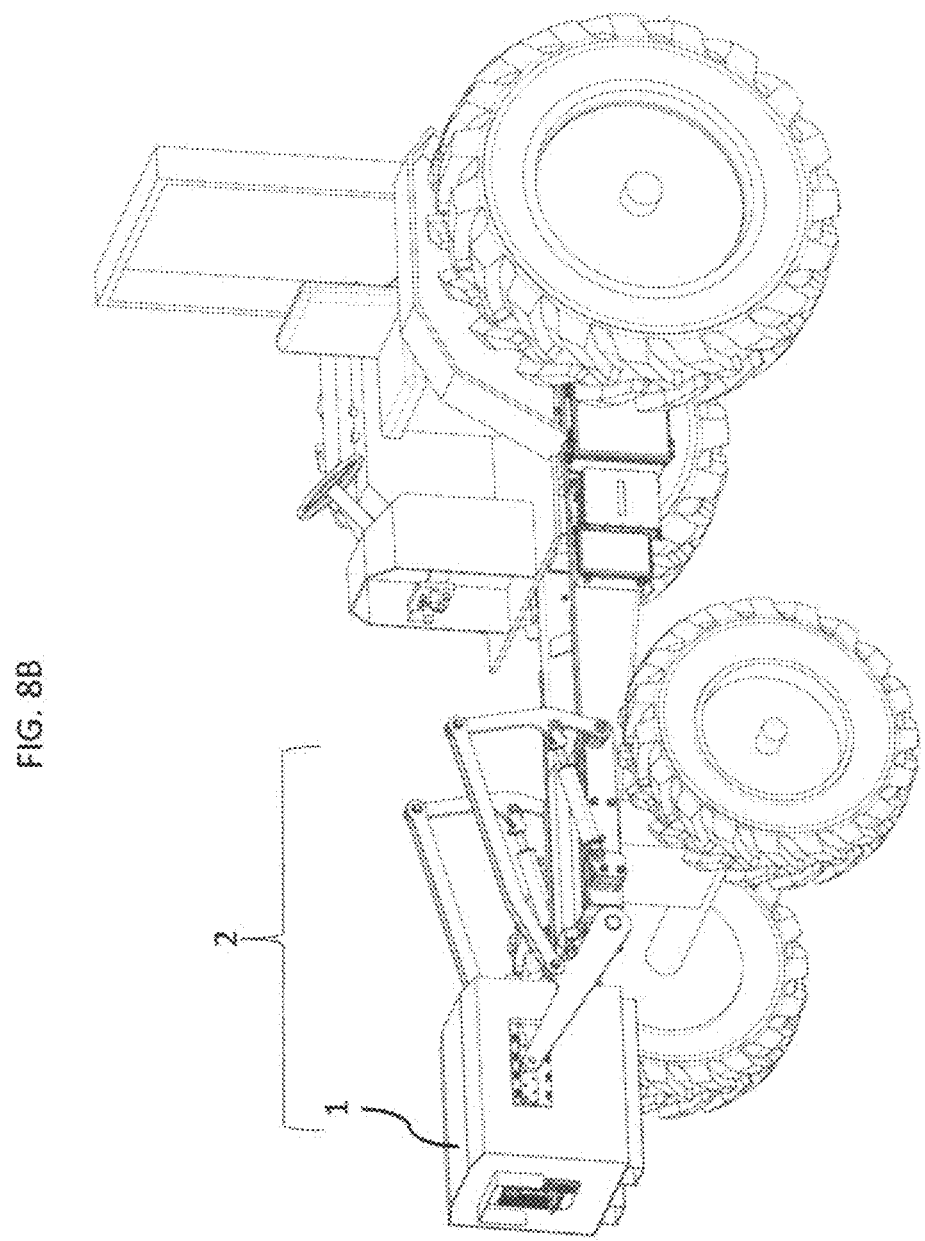
FIG. 8B is a view of the lift system with the battery.
Figure 9:
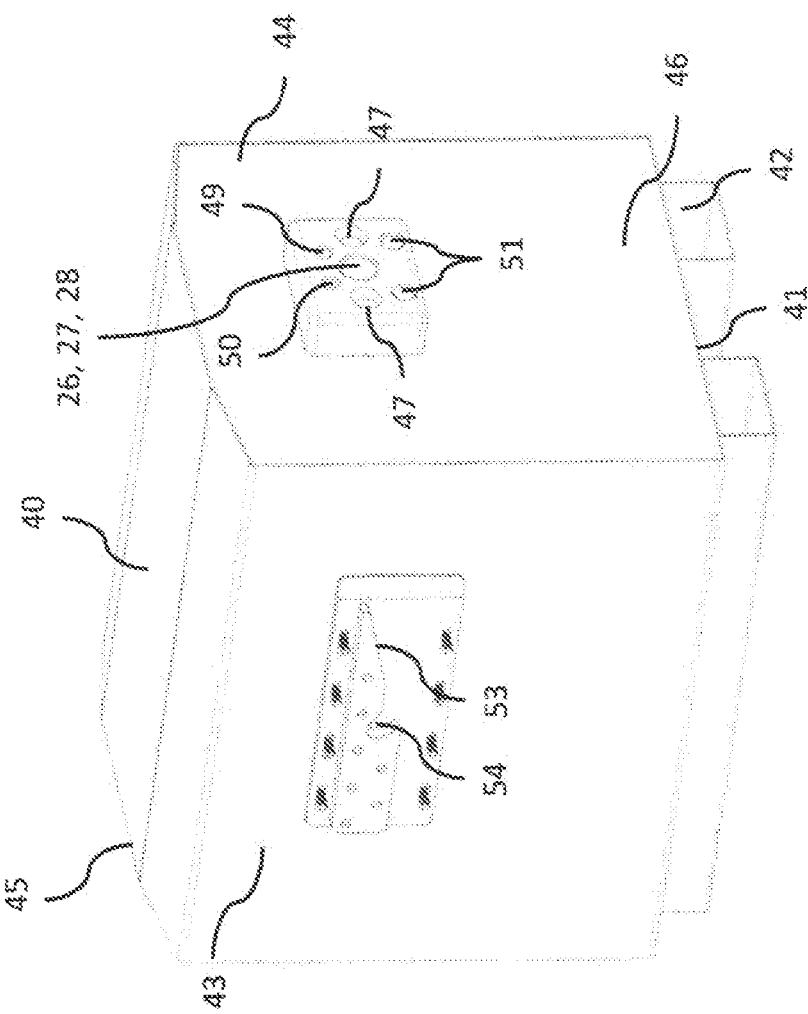
FIG. 9 is a view of the exterior of the battery.
Figure 10:
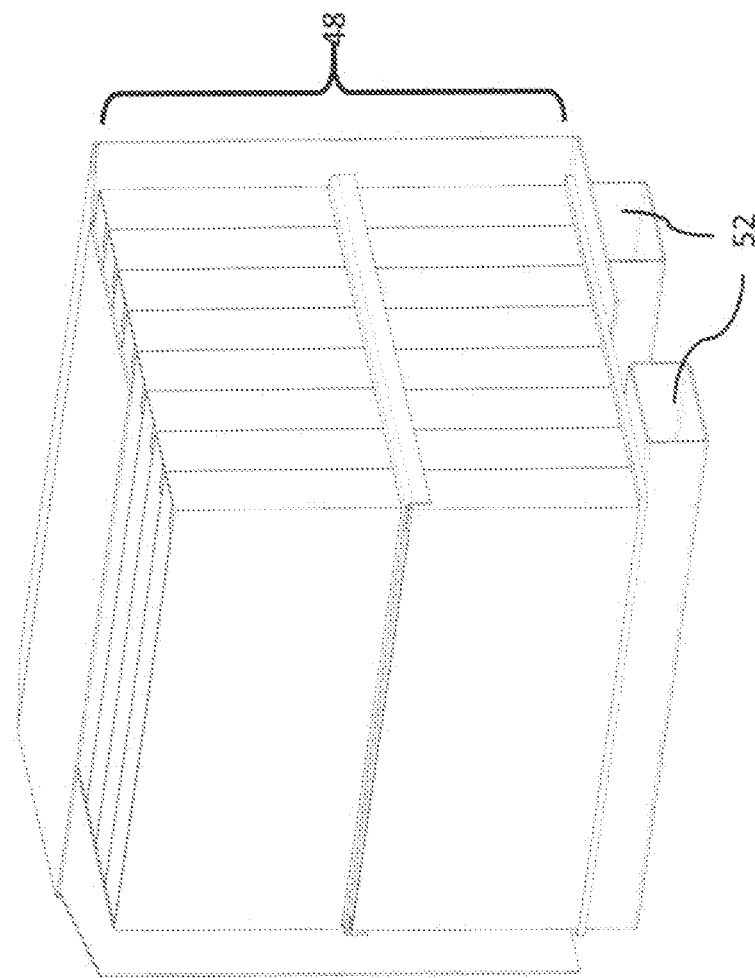
FIG. 10 is a view of the interior of the battery.
Figure 11:
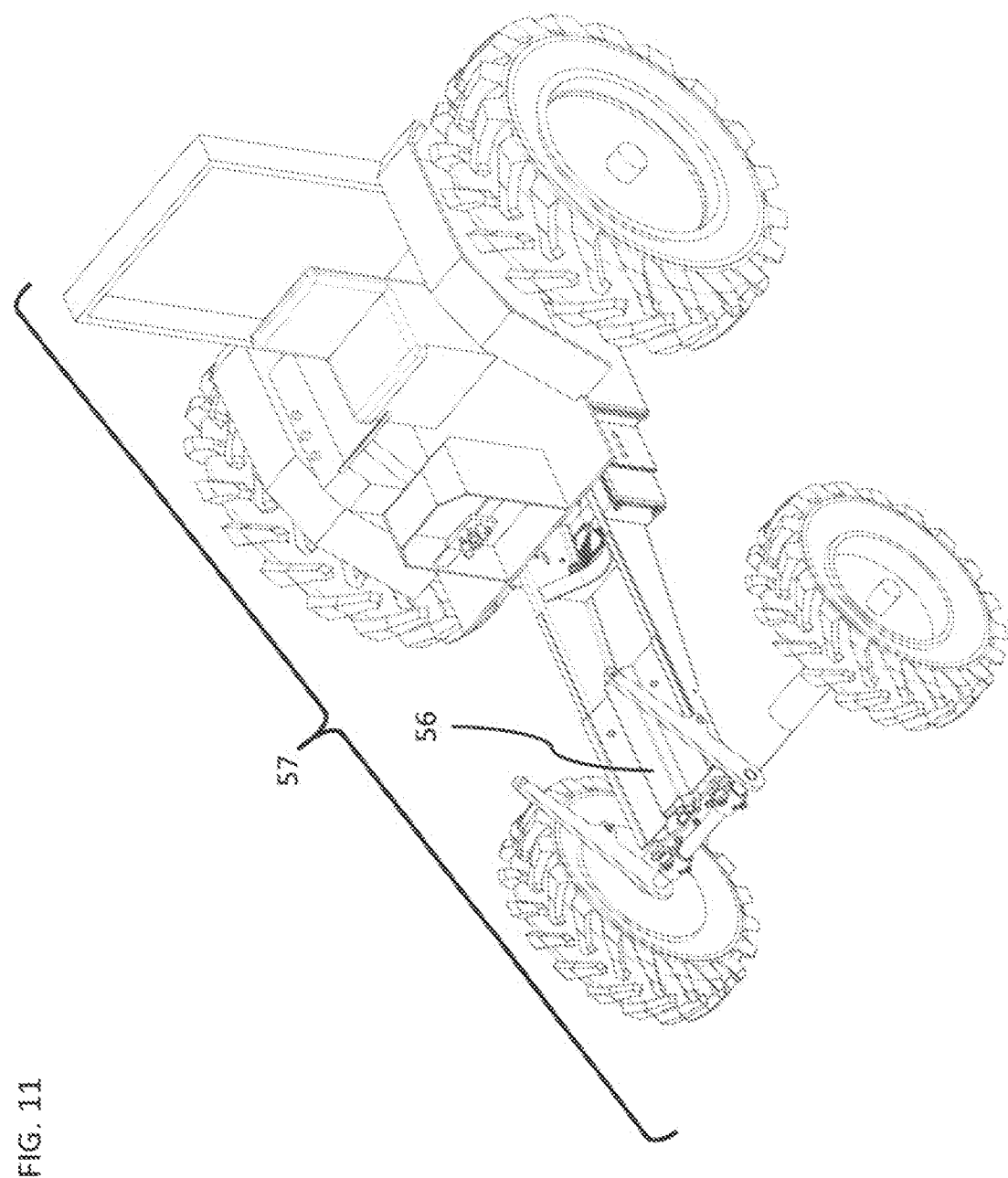
FIG. 11 is a view the first embodiment of the electric vehicle wherein the lift is mounted to the front of a vehicle and there is a platform that extends and retracts.
Figure 12:
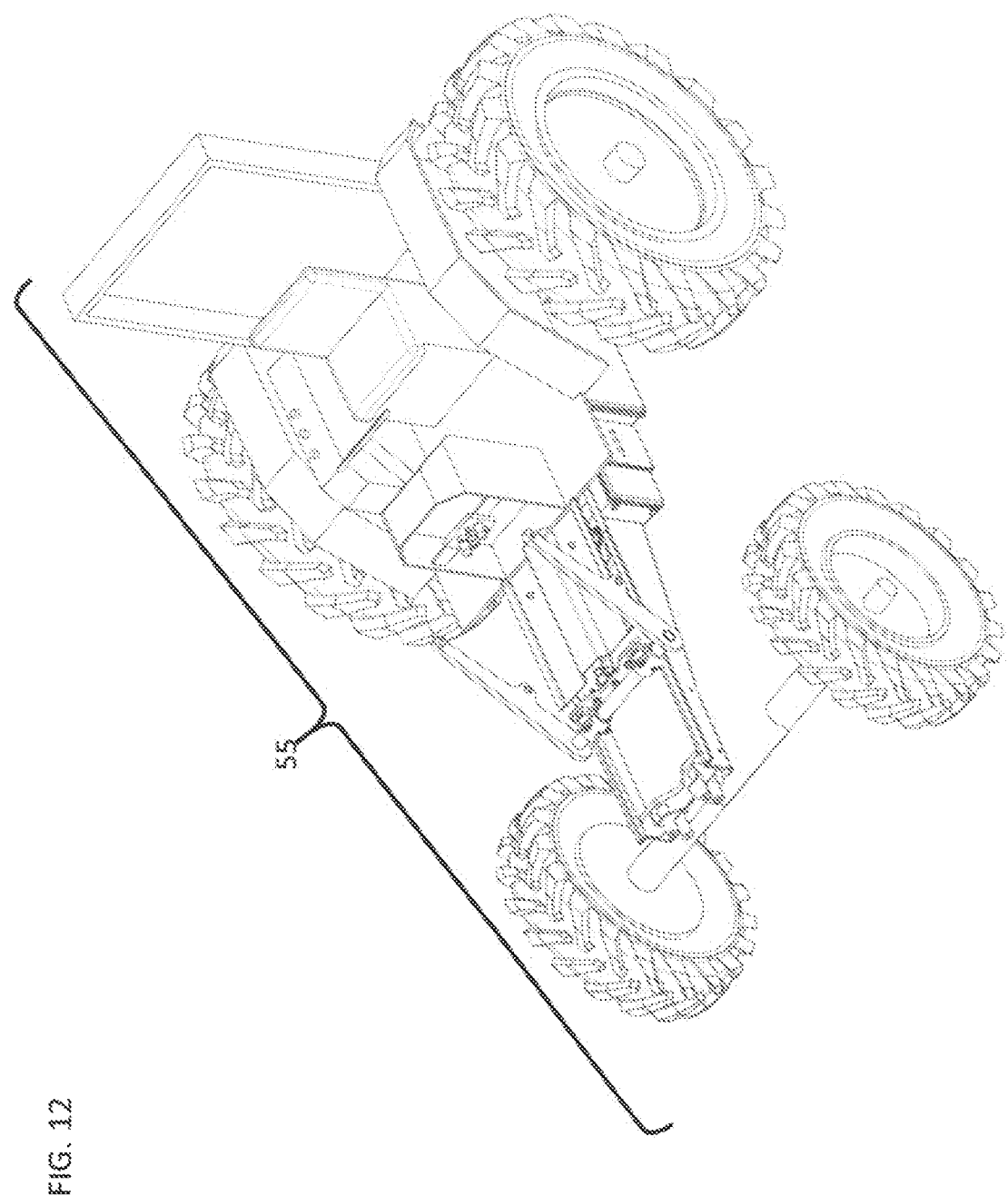
FIG. 12 is a view of the second embodiment of the electric vehicle, wherein the lift is mounted to the platform, and the platform extends and retracts along with the lift.
Figure 13:
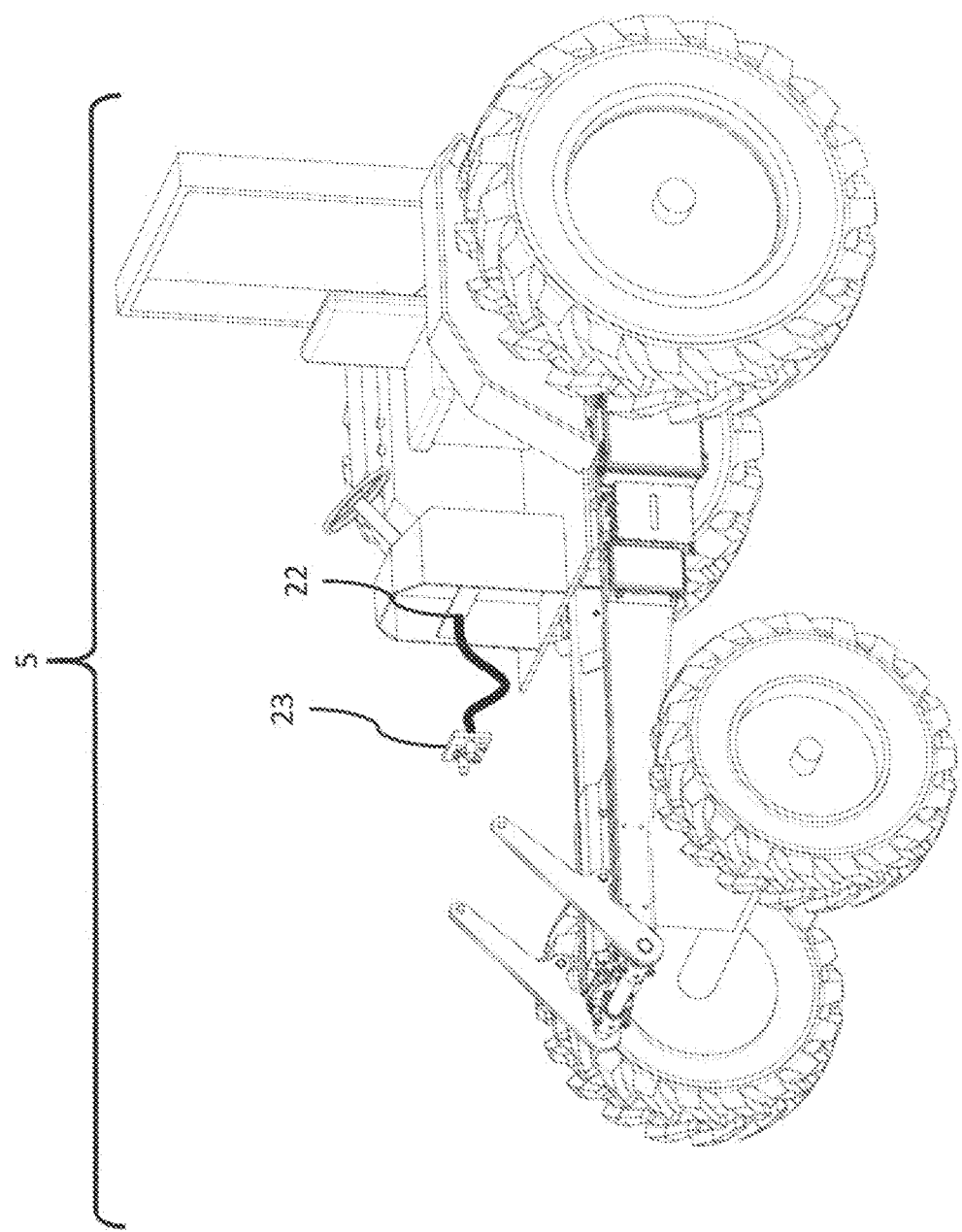
FIG. 13 is a view of the third embodiment of the electric vehicle wherein the battery is placed within the space and the port coupler extends and retracts to connect the battery to the electric vehicle.
Figure 14:
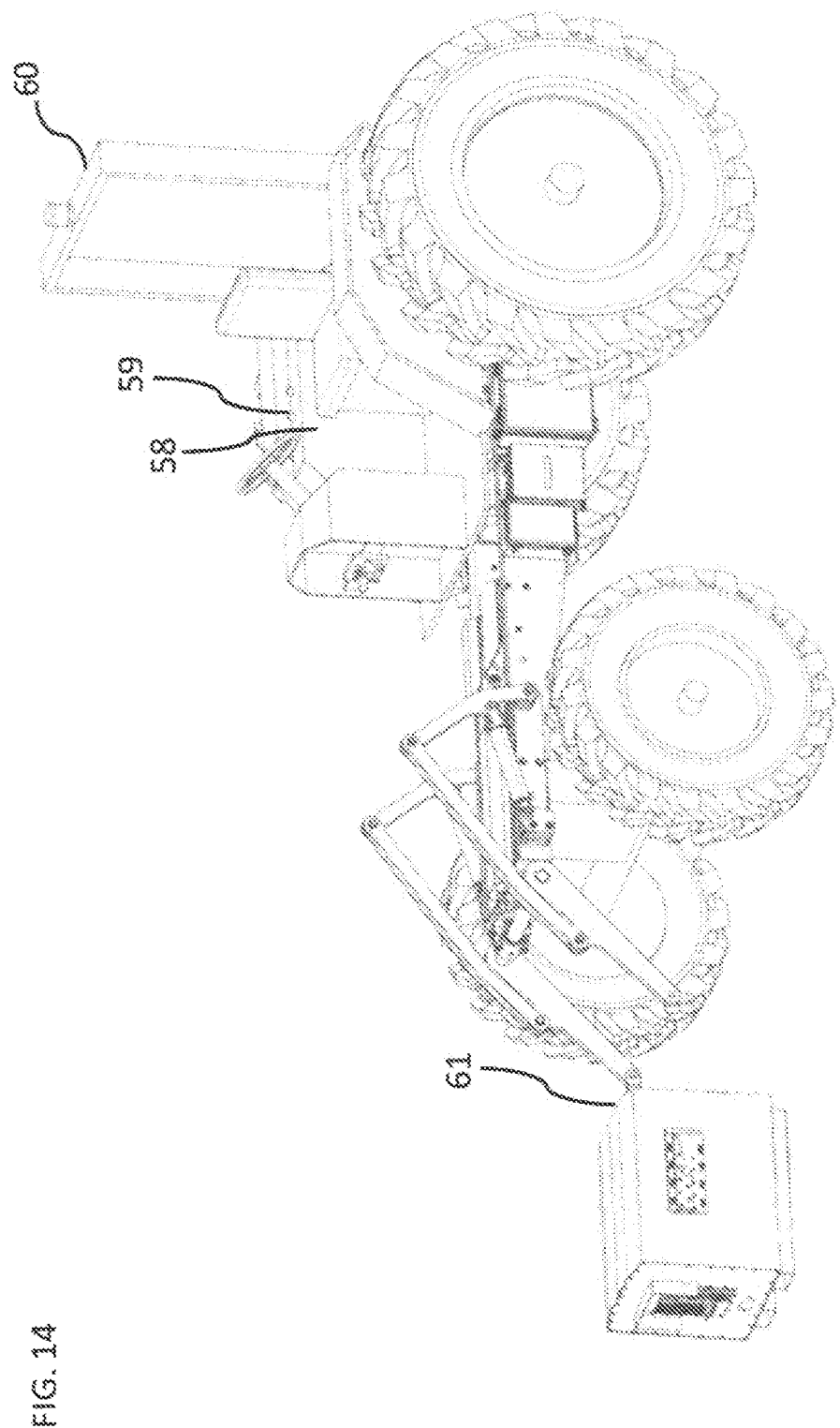
FIG. 14 is a view of the electric vehicle with the lift and battery wherein the system is automated.

The present disclosure reveals a battery 1 and lift 2, the lift 2 being attached to an electric vehicle 3 so that the battery 1 can be uninstalled and installed into the electric vehicle 3 in the field, said battery 1 and lift 2 comprising an electric vehicle 3, a battery 1, an auxiliary battery 4, and a lift 2. Within the disclosure the battery 1 and lift 2 have three embodiments.

The electric vehicle 3 comprises an operator station 6, the auxiliary battery 4, and a space 7. The space 7 has sufficient room for the lift 2, and a position 8 for the lift 2 to place the battery 1. The auxiliary battery 4 being connected to the electric vehicle 3 and lift 2 to supply power to the electric vehicle 3 when the battery 1 is not in place or the battery 1 is fully discharged. The auxiliary battery 4 further comprising a battery management system 9 to control when power is coming from the auxiliary battery 4 and when it is derived from the battery 1.

Within the operator station 6, amongst other features, is the vehicle control unit 10 that controls the lift 2 when connected and the vehicle propulsion.

Within the space is the lift 2, which comprises a lift mechanism 11, a coolant system 12 (which may also cool other systems not part of the lift), and a port coupler 13.

There is also a monitoring and control system 14.

The coolant system 12 comprises a heat exchanger 15, fan 16, a pump 17, and a power supply 18 from at least one of the auxiliary battery 4 and the battery 1 where the power supply 18 only draws from the auxiliary battery 4 when the battery 1 is not connected to the electric vehicle 3 or is fully discharged.

The heat exchanger 15 comprises an intake 19, an outflow 20, and the heat exchange surface 21, and has the pump 17 attached so as to cause coolant to flow through the heat exchanger 15 out the outflow 20, said outflow 20 going to the port coupler 13, wherein the port coupler 13 attaches to the battery 1 so that the coolant can cool the battery 1, and where the coolant flows from the battery 1 through the intake 19 and back to the heat exchanger 15, and the fan 16 causes air to pass over the heat exchanger surface 21 to cause heat in the fluid to be transferred to the air to cool the coolant.

The port coupler 13 comprises a first end 22 and a second end 23. The first end 22 of the port coupler 13 is connected to the vehicle control unit 10 and extends from the electric vehicle 3 so as to allow the second end 23 of the port coupler 13 to connect to the battery 1. The port coupler 13 further comprises the outflow 20, the intake 19, cabling 24 to connect the battery 1 to the electric vehicle 3, wiring 25 for a plurality of temperature probes 26 within the battery 1, and conduits 27 for a plurality of voltage probes 28 within the battery 1. In the revealed embodiments, the port coupler 13 can extend to connect to the battery 1 or the battery 1 can be moved to connect to the port coupler 13.

The lift mechanism 11 comprises a movement system 29, an activator system 30, a left arm 31, a right arm 32, a control interface 33. The movement system 11 is at least one of a hydraulic system or a gear system. The left arm 31 comprises a first end 34 and a second end 35 and wherein the right arm 32 has a first end 36 and a second end 37. The first end 34 of the left arm 31 is attached to the movement system 29, which causes the left arm 31 to move in at least one of the following; in a vertical arc, extend and retract, or move side to side. The first end 36 of the right arm 32 is attached to the movement system 29, which causes the right arm 32 to move in at least one of the following; in a vertical arc, extend and retract, or move side to side. The left arm 31 and the right arm 32 can further move in at least one of in unison or individually.

The second end 35 of the left arm 31 comprises an attachment mechanism A 38. The second end 37 of the right arm 32 comprises an attachment mechanism B 39. The attachment mechanism A 38 and the attachment mechanism B 39 attach to the battery 1 to allow the battery 1 to be lifted by the left arm 31 and right arm 32 and the attachment mechanism A 38 and attachment mechanism B 39 act so as to allow the battery 1 to rotate while being lifted to the position 8 so as to keep the battery 1 level. The movement of the left arm 31 and the right arm 32 is controlled by the activator system 30, and the activator system 30 is operated by the control interface 33, which is connected to the monitoring and control system 14, located in the operator station 6.

The battery 1 comprises a top 40, a bottom 41, a base 42, a left side 43, a right side 44, a front 45, a back 46, a connection port 47, a plurality of battery cells 48, a lead positive terminal 49, a lead negative terminal 50, coolant channels 51, a plurality of temperature probes 26 (wherein the plurality of temperature probes means at least one temperature probe), and a plurality of voltage probes 28 (wherein the plurality of voltage probes means at least one voltage probe).

Between the bottom 41 of the battery 1 and the base 42 are a plurality of openings 52 that allow the battery 1 to be lifted and carried by means of a fork lift or other machine.

The left side 42 possesses a guide slot 53 to guide attachment mechanism A 38 into place and an anchor point 54 to connect attachment mechanism A 38 to the left side 42 of the battery 1. The right side 44 possesses a guide slot 53 to guide attachment mechanism B 39 into place and an anchor point 54 to connect attachment mechanism B 39 to the right side 44 of the battery 1. The connection port 47 is located on the back 46 of the battery 1 and connects the battery 1 to the electric vehicle 3 with the use of the port coupler 13.

The lead positive terminal 49 and the lead negative terminal 50 connect the plurality of battery cells 48 together and connects to the cabling 24 to connect the battery 1 to the electric vehicle 3. The plurality of coolant channels 51 allow coolant to circulate around the plurality of battery cells 48 of the battery 1, cooling each of the battery cells 48 of the plurality of battery cells 48. The plurality of temperature probes 26 of the battery 1 are placed in the battery 1 to monitor the overall operating temperature of the battery 1 and are connected to the wiring 25 for the plurality of temperature probes 26 and connect to the monitoring and control system 14 in the operator station 6 so the operator can monitor the overall temperature of the battery 1. The plurality of voltage probes 28 of the battery 1 are placed in the battery 1 to monitor the overall charge of the battery 1 and are connected to the conduit 27 for the plurality of voltage probes 28 and connect to the monitoring and control system 14 in the operator station 6 so the operator can monitor the overall charge of the battery 1 so as to know when to swap out a different battery.

In the first embodiment 57 the electric vehicle 3 further comprises a platform 56 in the position 8, between the port coupler 13 and the lift 2, such that the battery 1 is placed on the platform 56 by the lift 2 and then the platform 56 moves to allow the port coupler 13 to connect to the battery 1.

In the second embodiment 55 the electric vehicle 3 further comprises a platform 56 in the space 7. The lift 2 is on the platform 56 and the platform 56 extends and retracts from the electric vehicle 3, such that when the battery 1 is on the platform 56, in the position 8, and the platform 56 retracts, the movement of the platform 56 allows the battery 1 to connect to the port coupler 13.

In the third embodiment 5, the second end 23 of the port coupler 13 can extend and retract, such that when the second end 23 of the port coupler 13 is extended the port coupler 13 connects to the battery 1.

In any of the embodiments, the lift mechanism 11 and port coupler 13 can be operated automatically/autonomously through the automation system 58, said automation system 58 comprising an activation mechanism 59 in the operator station 6 that engages the automation programing in the monitoring and control system 14, and the monitoring and control system 14 uses at least one of a plurality of sensors (defined as at least one sensor) on the vehicle 60 or a plurality of sensors (defined as at least one sensor) on the vehicle 60 and a plurality of sensors (defined as at least one sensor) on the battery 61 to locate and position the vehicle 3 relative to the battery 1 and automatically/autonomously remove or install a battery 1.

What is claimed:

1. A lift and battery system, a lift being attached to an electric vehicle so that a battery is uninstalled and installed into the electric vehicle in the field, said lift and battery system comprising:
    an electric vehicle, a battery, an auxiliary battery, and a lift;
    the electric vehicle comprising an operator station, a platform, the auxiliary battery, and a space;
    the operator station comprises the vehicle control unit that controls the lift and monitors the battery when connected;
    the space with sufficient room for the lift, and a position for the lift to place the battery;
    the platform being located adjacent to the lift, and extends and retracts;
    the auxiliary battery being connected to the electric vehicle and lift to supply power to the electric vehicle when the battery is not in place or the battery is fully discharged;

the auxiliary battery further comprising a battery management system to control when power is coming from the auxiliary battery and when it is derived from the battery;
the lift comprising a lift mechanism, a coolant system, a port coupler, and a monitoring and control system;
the coolant system comprising a heat exchanger, fan, a pump, a plurality of temperature probes, and a power supply from at least one of the auxiliary battery and the battery where the power supply only draws from the auxiliary battery when the battery is not connected to the electric vehicle or is fully discharged;
the heat exchanger comprising an intake and an outflow, having said pump attached so as to cause coolant to flow through the heat exchanger out the outflow, said outflow going to the port coupler, wherein the port coupler attaches to the battery so that the coolant can cool the battery, and where the coolant flows from the battery through the intake in the port coupler and back to the heat exchanger, and where said fan causes air to pass over the heat exchanger to cause heat to be transferred to the air to cool the coolant;
the port coupler comprising a first end and a second end;
wherein the first end of the port coupler is connected to the vehicle control unit and extends from the electric vehicle so as to allow the second end of the port coupler to connect to the battery when the platform adjusts from the position adjacent to the lift to the position to allow the connection of the port coupler to the battery;
wherein the port coupler further comprises the outflow, the intake, cabling to connect the battery to the electric vehicle, wiring for a plurality of temperature probes within the battery, and conduits for a plurality of power level monitors within the battery;
the lift mechanism comprises a movement system, an activator system, a left arm, a right arm, a control interface;
wherein the movement system is at least one of a hydraulic system or a gear system;
wherein the left arm has a first end and a second end and wherein the right arm has a first end and a second end;
wherein the first end of the left arm is attached to the movement system, which causes the left arm to move in at least one of the following in a vertical arc, extend and retract, or move side to side;
wherein the first end of the right arm is attached to the movement system, which causes the left arm to move in at least one of the following in a vertical arc, extend and retract, or move side to side;
wherein the left arm and the right arm can further move in at least one of in unison or individually;
wherein the second end of the left arm comprises an attachment mechanism A;
wherein the second end of the right arm comprises an attachment mechanism B;
wherein the attachment mechanism A and the attachment mechanism B attach to the battery to allow the battery to be lifted by the left arm and right arm and the attachment mechanism A and attachment mechanism B act so as to allow the battery to rotate while being lifted to the space so as to keep the battery level;
wherein the movement of the left arm and the right arm is controlled by the activator system, and the activator system is operated by the control interface, which is connected to the monitoring and control system, located in the operator station;
the battery comprising a top, a bottom, a base, a left side, a right side, a front, a back, a connection port, a plurality of battery cells, a lead positive terminal, a lead negative terminal, coolant channels, a plurality of temperature probes, and a plurality of voltage probes;
whereas between the bottom of the battery and the base are a plurality of openings that allow the battery to be lifted and carried;
whereas the left side possesses a guide slot to guide attachment mechanism A into place and an anchor point to connect attachment mechanism A to the left side of the battery;
whereas the right side possesses a guide slot to guide attachment mechanism B into place and an anchor point to connect attachment mechanism B to the right side of the battery;
whereas the connection port is located on the back of the battery and connects port coupler to the battery;
whereas the lead positive terminal and the lead negative terminal connects the plurality of battery cells together and connects to the cabling to connect the battery to the electric vehicle;
whereas the plurality of coolant channels allow the coolant to circulate around the cells of the battery, cooling the cells;
whereas the plurality of temperature probes of the battery are placed in the battery to monitor the overall operating temperature of the battery and are connected to the wiring for the plurality of temperature probes and connect to the monitoring and control system in the operator station so the operator can monitor the overall temperature of the battery, and
whereas the plurality of voltage probes of the battery are placed in the battery to monitor the overall voltage of the battery, are connected to the conduit for the plurality of voltage probes, and connect to the monitoring and control system in the operator station so the operator can monitor the overall voltage of the battery so as to know when to swap out a different battery.

2. The lift and battery system of claim 1 wherein the lift mechanism and port coupler are operated automatically/autonomously through the automation system, said automation system comprising an activation mechanism in the operator station that engages the automation programing in the monitoring and control system, and the monitoring and control system uses at least one of a plurality of sensors on the vehicle or a plurality of sensors on the vehicle and a plurality of sensors on the battery to locate and position the vehicle relative to the battery and automatically/autonomously remove or install a battery.

3. A lift and battery system, a lift being attached to an electric vehicle so that a battery is uninstalled and installed into the electric vehicle in the field, said lift and battery system comprising:
An electric vehicle, a battery, an auxiliary battery, and a lift;
the electric vehicle comprising an operator station, a platform, the auxiliary battery, and a space;
the operator station comprises the vehicle control unit that controls the lift and monitors the battery when connected;
the space with sufficient room for the lift and a position for the lift to place the battery;
the platform being located in the space, has the lift attached, and extends and retracts from the electric vehicle;

the auxiliary battery being connected to the electric vehicle and lift to supply power to the electric vehicle when the battery is not in place or the battery is fully discharged;

the auxiliary battery further comprising a battery management system to control when power is coming from the auxiliary battery and when it is derived from the battery;

the lift comprising a lift mechanism, a coolant system, a port coupler, and a monitoring and control system;

the coolant system comprising a heat exchanger, fan, a pump, a plurality of temperature probes, and a power supply from at least one of the auxiliary battery and the battery where the power supply only draws from the auxiliary battery when the battery is not connected to the electric vehicle or is fully discharged;

the heat exchanger comprising an intake and an outflow, having said pump attached so as to cause coolant to flow through the heat exchanger out the outflow, said outflow going to the port coupler, wherein the port coupler attaches to the battery so that the coolant can cool the battery, and where the coolant flows from the battery through the intake in the port coupler and back to the heat exchanger, and where said fan causes air to pass over the heat exchanger to cause heat to be transferred to the air to cool the coolant;

the port coupler comprising a first end and a second end;

wherein the first end of the port coupler is connected to the vehicle control unit and extends from the electric vehicle so as to allow the second end of the port coupler to connect to the battery;

wherein the port coupler further comprises the outflow, the intake, cabling to connect the battery to the electric vehicle, wiring for a plurality of temperature probes within the battery, and conduits for a plurality of power level monitors within the battery;

the lift mechanism comprises a movement system, an activator system, a left arm, a right arm, a control interface;

wherein the movement system is at least one of a hydraulic system or a gear system;

wherein the left arm has a first end and a second end and wherein the right arm has a first end and a second end;

wherein the first end of the left arm is attached to the movement system, which causes the left arm to move in at least one of the following in a vertical arc, extend and retract, or move side to side;

wherein the first end of the right arm is attached to the movement system, which causes the left arm to move in at least one of the following in a vertical arc, extend and retract, or move side to side;

wherein the left arm and the right arm can further move in at least one of in unison or individually;

wherein the second end of the left arm comprises an attachment mechanism A;

wherein the second end of the right arm comprises an attachment mechanism B;

wherein the attachment mechanism A and the attachment mechanism B attach to the battery to allow the battery to be lifted by the left arm and right arm and the attachment mechanism A and attachment mechanism B act so as to allow the battery to rotate while being lifted to the space so as to keep the battery level;

wherein the movement of the left arm and the right arm is controlled by the activator system, and the activator system is operated by the control interface, which is connected to the monitoring and control system, located in the operator station;

the battery comprising a top, a bottom, a base, a left side, a right side, a front, a back, a connection port, a plurality of battery cells, a lead positive terminal, a lead negative terminal, coolant channels, a plurality of temperature probes, and a plurality of voltage probes;

whereas between the bottom of the battery and the base are a plurality of openings that allow the battery to be lifted and carried;

whereas the left side possesses a guide slot to guide attachment mechanism A into place and an anchor point to connect attachment mechanism A to the left side of the battery;

whereas the right side possesses a guide slot to guide attachment mechanism B into place and an anchor point to connect attachment mechanism B to the right side of the battery;

whereas the connection port is located on the back of the battery and connects port coupler to the battery;

whereas the lead positive terminal and the lead negative terminal connects the plurality of battery cells together and connects to the cabling to connect the battery to the electric vehicle;

whereas the plurality of coolant channels allow the coolant to circulate around the cells of the battery, cooling the cells;

whereas the plurality of temperature probes of the battery are placed in the battery to monitor the overall operating temperature of the battery and are connected to the wiring for the plurality of temperature probes and connect to the monitoring and control system in the operator station so the operator can monitor the overall temperature of the battery, and whereas the plurality of voltage probes of the battery are placed in the battery to monitor the overall voltage of the battery, are connected to the conduit for the plurality of voltage probes, and connect to the monitoring and control system in the operator station so the operator can monitor the overall voltage of the battery so as to know when to swap out a different battery.

4. The lift and battery system of claim 3 wherein the lift mechanism and port coupler are operated automatically/autonomously through the automation system, said automation system comprising an activation mechanism in the operator station that engages the automation programing in the monitoring and control system, and the monitoring and control system uses at least one of a plurality of sensors on the vehicle or a plurality of sensors on the vehicle and a plurality of sensors on the battery to locate and position the vehicle relative to the battery and automatically/autonomously remove or install a battery.

5. A lift and battery system, a lift being attached to an electric vehicle so that a battery is uninstalled and installed into the vehicle in the field, said lift and battery system comprising:

An electric vehicle, a battery, an auxiliary battery, and a lift;

the electric vehicle comprising an operator station, the auxiliary battery, and a space;

the operator station comprises the vehicle control unit that controls the lift and monitors the battery when connected;

the space with sufficient room for the lift and a position for the lift to place the battery;

the auxiliary battery being connected to the electric vehicle and lift to supply power to the electric vehicle when the battery is not in place or the battery is fully discharged;

the auxiliary battery further comprising a battery management system to control when power is coming from the auxiliary battery and when it is derived from the battery;

the lift comprising, a lift mechanism, a coolant system, a port coupler, and a monitoring and control system;

the coolant system comprising a heat exchanger, fan, a pump, a plurality of temperature probes, and a power supply from at least one of the auxiliary battery and the battery where the power supply only draws from the auxiliary battery when the battery is not connected to the electric vehicle or is fully discharged;

the heat exchanger comprising an intake and an outflow, having said pump attached so as to cause coolant to flow through the heat exchanger out the outflow, said outflow going to the port coupler, wherein the port coupler attaches to the battery so that the coolant can cool the battery, and where the coolant flows from the battery through the intake in the port coupler and back to the heat exchanger, and where said fan causes air to pass over the heat exchanger to cause heat to be transferred to the air to cool the coolant;

the port coupler comprising a first end and a second end;

wherein the first end of the port coupler is connected to the vehicle control unit and extends and retracts from the electric vehicle so as to allow the second end of the port coupler to connect or disconnect to the battery;

wherein the port coupler further comprises the outflow, the intake, cabling to connect the battery to the electric vehicle, wiring for a plurality of temperature probes within the battery, and conduits for a plurality of power level monitors within the battery;

the lift mechanism comprises a movement system, an activator system, a left arm, a right arm, a control interface;

wherein the movement system is at least one of a hydraulic system or a gear system;

wherein the left arm has a first end and a second end and wherein the right arm has a first end and a second end;

wherein the first end of the left arm is attached to the movement system, which causes the left arm to move in at least one of the following in a vertical arc, extend and retract, or move side to side;

wherein the first end of the right arm is attached to the movement system, which causes the left arm to move in at least one of the following in a vertical arc, extend and retract, or move side to side;

wherein the left arm and the right arm can further move in at least one of in unison or individually;

wherein the second end of the left arm comprises an attachment mechanism A;

wherein the second end of the right arm comprises an attachment mechanism B;

wherein the attachment mechanism A and the attachment mechanism B attach to the battery to allow the battery to be lifted by the left arm and right arm and the attachment mechanism A and attachment mechanism B act so as to allow the battery to rotate while being lifted to the space so as to keep the battery level;

wherein the movement of the left arm and the right arm is controlled by the activator system, and the activator system is operated by the control interface, which is connected to the monitoring and control system, located in the operator station;

the battery comprising a top, a bottom, a base, a left side, a right side, a front, a back, a connection port, a plurality of battery cells, a lead positive terminal, a lead negative terminal, coolant channels, a plurality of temperature probes, and a plurality of voltage probes;

whereas between the bottom of the battery and the base are a plurality of openings that allow the battery to be lifted and carried;

whereas the left side possesses a guide slot to guide attachment mechanism A into place and an anchor point to connect attachment mechanism A to the left side of the battery;

whereas the right side possesses a guide slot to guide attachment mechanism B into place and an anchor point to connect attachment mechanism B to the right side of the battery;

whereas the connection port is located on the back of the battery and connects the port coupler to the battery;

whereas the lead positive terminal and the lead negative terminal connects the plurality of battery cells together and connects to the cabling to connect the battery to the electric vehicle;

whereas the plurality of coolant channels allow the coolant to circulate around the cells of the battery, cooling the cells;

whereas the plurality of temperature probes of the battery are placed in the battery to monitor the overall operating temperature of the battery and are connected to the wiring for the plurality of temperature probes and connect to the monitoring and control system in the operator station so the operator can monitor the overall temperature of the battery, and whereas the plurality of voltage probes of the battery are placed in the battery to monitor the overall voltage of the battery, are connected to the conduit for the plurality of voltage probes and connect to the monitoring, and control system in the operator station so the operator can monitor the overall voltage of the battery so as to know when to swap out a different battery.

6. The lift and battery system of claim 5 wherein the lift mechanism and port coupler are operated automatically/autonomously through the automation system, said automation system comprising an activation mechanism in the operator station that engages the automation programing in the monitoring and control system, and the monitoring and control system uses at least one of a plurality of sensors on the vehicle or a plurality of sensors on the vehicle and a plurality of sensors on the battery to locate and position the vehicle relative to the battery and automatically/autonomously remove or install a battery.

* * * * *